United States Patent
Zhao

(10) Patent No.: US 10,699,660 B2
(45) Date of Patent: Jun. 30, 2020

(54) SCAN-DRIVING CIRCUIT AND LIQUID CRYSTAL DISPLAY

(71) Applicant: WUHAN CHINA STAR OPTOELECTRONICS TECHNOLOGY CO., LTD., Wuhan (CN)

(72) Inventor: Mang Zhao, Wuhan (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 15/667,670

(22) PCT Filed: Apr. 18, 2017

(86) PCT No.: PCT/CN2017/080943
§ 371 (c)(1),
(2) Date: Aug. 3, 2017

(87) PCT Pub. No.: WO2018/176515
PCT Pub. Date: Oct. 4, 2018

(65) Prior Publication Data
US 2020/0020290 A1    Jan. 16, 2020

(30) Foreign Application Priority Data
Mar. 29, 2017  (CN) .......................... 2017 1 0197444

(51) Int. Cl.
G09G 3/36       (2006.01)
G02F 1/1345     (2006.01)

(52) U.S. Cl.
CPC ....... *G09G 3/3677* (2013.01); *G02F 1/13454* (2013.01); *G09G 2310/0243* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 2017/0263203 A1* | 9/2017 | Zhao | ............... G09G 3/3677 |
| 2018/0108300 A1 | 4/2018 | Zhao | |
| 2018/0182338 A1 | 6/2018 | Gong et al. | |

FOREIGN PATENT DOCUMENTS

| | | | | |
|---|---|---|---|---|
| CN | 106057131 A | | 10/2016 | |
| CN | 106098001 A | | 11/2016 | |
| CN | 106098016 A | | 11/2016 | |
| CN | 106444198 A | | 2/2017 | |
| CN | 106486079 A | * | 3/2017 | ............... G09G 3/36 |
| CN | 106486079 A | | 3/2017 | |

\* cited by examiner

*Primary Examiner* — Kenneth B Lee, Jr.
(74) *Attorney, Agent, or Firm* — Soroker Agmon Nordman

(57) ABSTRACT

The present disclosure provides a scan-driving circuit and a liquid crystal display, which comprises a scan-level-signal-output module, a present-stage cascaded-signal-output module, and a present-stage scanning-signal-output module. The scan-level-signal-output module is used for generating a scanning level signal and for performing a latching operation on the scanning level signal. A forward/reverse scanning control signal is used for controlling the scanning drive unit be on a forward-driving mode or a reverse-driving mode.

20 Claims, 4 Drawing Sheets

SCAN-DRIVING CIRCUIT AND LIQUID CRYSTAL DISPLAY

BACKGROUND OF THE INVENTION

Field of Invention

The present disclosure relates to the field of liquid crystal display technology, and particularly to a liquid crystal display and a liquid crystal display.

Description of Prior Art

Gate driver On Array (GOA) is the use of existing manufacturing process of thin film transistor liquid crystal display array substrate to manufacture the scan-driving signal circuit of gate lines on the array substrate, to achieve the progressive scan-driving on gate lines.

With the development of the Low Temperature Poly-Silicon (LTPS) semiconductor thin film transistors, and due to the ultra-high carrier mobility of the LTPS semiconductors, correspondingly, the integrated circuit around the panel peripherals has become the focus, and many people are into the research of the System On Panel (SOP) related technology.

Referring to FIG. 1, FIG. 1 is a schematic illustrative drawing of a conventional scan-driving circuit. As shown in FIG. 1, the conventional scan-driving circuit uses a large number of thin film transistors, and it is necessary to carry out the forward/reverse scanning control of the scanning driving circuit through the two signal lines U2D and D2U, the frame width of the panel are largely increased, the cost is increased. Besides, two clock signal lines CK1, CK3 are used in the scan-driving circuit. XCK1 is a signal opposite to the clock signal CK1. Among them, CK1 controls the driving of four thin film transistors, CK3 controls the driving of two thin film transistors. This circuit design will bring a great loading to the CK signal line, greatly increasing the power consumption of the scan-driving circuit, when the power consumption is serious, the circuit function will be affected.

Therefore, it is necessary to provide a scan-driving circuit and a liquid crystal display to solve the problems existing in the conventional art.

SUMMARY OF THE INVENTION

The objectives of the present disclosure is to provide a scan-driving circuit and a liquid crystal display which can not only greatly reduce the number of thin film transistors in the scan-driving circuit, but also the thin film transistors are driven with almost no clock signal, to greatly reduce the loading on the clock signal line, to reduce the power consumption of the scan-driving circuit, further reducing the panel frame width.

The present disclosure provides a scan-driving circuit, which comprises a plurality of scan-driving units connected in a cascade mode, a (N)th scan-driving unit of the scan-driving units comprises:

A scan-level-signal-output module is used for inputting a forward/reverse scanning control signal, a (N−1)th stage cascaded signal, and a (N+1)th stage cascaded signal, a scanning level signal is generated based on the forward/reverse scanning control signal, the (N−1)th stage cascaded signal, and the (N+1)th stage cascaded signal, and performs a latching operation on the scanning level signal, wherein the forward/reverse scanning control signal is used for controlling the scanning drive unit being on a forward-driving mode or a reverse-driving mode.

A present-stage cascaded-signal-output module is connected with the scan-level-signal-output module for inputting a present-stage clock signal and generating a present-stage cascaded signal based on the present-stage clock signal and the scanning level signal.

A present-stage scanning-signal-output module is connected with the present-stage cascaded-signal-output module, for outputting a present-stage scanning signal based on the present-stage cascaded signal.

The scan-level-signal-output module comprises a first switch, a second switch, a third switch, a fourth switch, a first inverter and a second inverter. The first switch and the fourth switch are N-type thin film transistors, the second switch and the third switch are P-type thin film transistors.

A first end of the first switch and a first end of the fourth switch both receive the forward/reverse scanning control signal. A control end of the first switch and a control end of the second switch receive the (N−1)th stage cascaded signal. A control end of the third switch and a control end of the fourth switch receive the (N+1)th stage cascaded signal.

A second end of the first switch connects with an input end of the first inverter and a second end of the second switch. A first end of the second switch connects with an output end of the second inverter.

An input end of the second inverter connects with a second end of the third switch and a second end of the fourth switch.

An output end of the first inverter and a first end of the third switch connect with an output end of the scan-level-signal-output module.

The scan-level-signal-output module comprises a first switch, a second switch, a third switch, a fourth switch, a first inverter and a second inverter. The first switch and the fourth switch are P-type thin film transistors. The second switch and the third switch are N-type thin film transistors.

A first end of the first switch and a first end of the fourth switch both receive the forward/reverse scanning control signal. A control end of the first switch and a control end of the second switch receive the (N+1)th stage cascaded signal. A control end of the third switch and a control end of the fourth switch receive the (N−1)th stage cascaded signal.

A second end of the first switch connects with an input end of the first inverter and a second end of the second switch. A first end of the second switch connects with an output end of the second inverter.

An input end of the second inverter connects with a second end of the third switch and a second end of the fourth switch.

An output end of the first inverter and a first end of the third switch connect with an output end of the scan-level-signal-output module.

In the scan-driving circuit of the present disclosure, the present-stage cascaded-signal-output module comprises a NAND gate controller and a third inverter.

A first input end of the NAND gate controller is connected with the output end of the scan-level-signal-output module, a second input end of the NAND gate controller inputs the present-stage clock signal, and an output end of the NAND gate controller is connected with an input end of the third inverter. An output end of the third inverter is connected with an output end of the present-stage cascaded-signal-output module.

In the scan-driving circuit of the present disclosure, the present-stage scanning-signal-output module comprises a fourth inverter and a fifth inverter connected in series.

An input end of the fourth inverter is connected with the output end of the present-stage cascaded-signal-output module, and an output end of the fifth inverter is connected with the output end of the present-stage scanning-signal-output module.

In the scan-driving circuit of the present disclosure, the present-stage cascaded-signal-output module comprises a NAND gate controller.

In the scan-driving circuit of the present disclosure, a first input end of the NAND gate controller is connected with the output end of the scan-level-signal-output module, a second input end of the NAND gate controller inputs the present-stage clock signal, and an output end of the NAND gate controller is connected with an output end of the present-stage cascaded-signal-output module.

In the scan-driving circuit of the present disclosure, the present-stage scanning-signal-output module comprises a third inverter, a fourth inverter and a fifth inverter connected in series.

An input end of the third inverter is connected with the output end of the present-stage cascaded-signal-output module, and an output end of the fifth inverter is connected with the output end of the present-stage scanning-signal-output module.

In the scan-driving circuit of the present disclosure, the scan-driving circuit further comprises a reset module, which comprises a fifth switch. A control end of the fifth switch receiving a reset signal, a first end of the fifth switch receives a constant-low voltage signal, and a second end of the fifth switch is connected with the output end of the scan-level-signal-output module. The fifth switch is a P-type thin film transistor. The first end, the second end and the control end of the fifth switch are respectively a source electrode, a drain electrode, and a gate electrode.

In the scan-driving circuit of the present disclosure, each of the scan-driving units is for driving a scanning line.

The present disclosure further provides a scan-driving circuit, which comprises a plurality of scan-driving units connected in a cascade mode, a (N)th scan-driving unit of the scan-driving units comprises:

A scan-level-signal-output module is used for inputting a forward/reverse scanning control signal, a (N−1)th stage cascaded signal, and a (N+1)th stage cascaded signal, a scanning level signal is generated based on the forward/reverse scanning control signal, the (N−1)th stage cascaded signal, and the (N+1)th stage cascaded signal, and performs a latching operation on the scanning level signal, wherein the forward/reverse scanning control signal is used for controlling the scanning drive unit being on a forward-driving mode or a reverse-driving mode.

A present-stage cascaded-signal-output module is connected with the scan-level-signal-output module for inputting a present-stage clock signal and generating a present-stage cascaded signal based on the present-stage clock signal and the scanning level signal.

A present-stage scanning-signal-output module is connected with the present-stage cascaded-signal-output module, for outputting a present-stage scanning signal based on the present-stage cascaded signal.

In the scan-driving circuit of the present disclosure, the scan-level-signal-output module comprises a first switch, a second switch, a third switch, a fourth switch, a first inverter and a second inverter. The first switch and the fourth switch are N-type thin film transistors, the second switch and the third switch are P-type thin film transistors.

A first end of the first switch and a first end of the fourth switch both receive the forward/reverse scanning control signal. A control end of the first switch and a control end of the second switch receive the (N−1)th stage cascaded signal. A control end of the third switch and a control end of the fourth switch receive the (N+1)th stage cascaded signal.

A second end of the first switch connects with an input end of the first inverter and a second end of the second switch. A first end of the second switch connects with an output end of the second inverter.

An input end of the second inverter connects with a second end of the third switch and a second end of the fourth switch.

An output end of the first inverter and a first end of the third switch connect with an output end of the scan-level-signal-output module.

In the scan-driving circuit of the present disclosure, the present-stage cascaded-signal-output module comprises a NAND gate controller and a third inverter.

A first input end of the NAND gate controller is connected with the output end of the scan-level-signal-output module, a second input end of the NAND gate controller inputs the present-stage clock signal, and an output end of the NAND gate controller is connected with an input end of the third inverter. An output end of the third inverter is connected with an output end of the present-stage cascaded-signal-output module.

In the scan-driving circuit of the present disclosure, the present-stage scanning-signal-output module comprises a fourth inverter and a fifth inverter connected in series.

An input end of the fourth inverter is connected with the output end of the present-stage cascaded-signal-output module, and an output end of the fifth inverter is connected with the output end of the present-stage scanning-signal-output module.

In the scan-driving circuit of the present disclosure, the scan-level-signal-output module comprises a first switch, a second switch, a third switch, a fourth switch, a first inverter and a second inverter. The first switch and the fourth switch are P-type thin film transistors. The second switch and the third switch are N-type thin film transistors.

A first end of the first switch and a first end of the fourth switch both receive the forward/reverse scanning control signal. A control end of the first switch and a control end of the second switch receive the (N+1)th stage cascaded signal. A control end of the third switch and a control end of the fourth switch receive the (N−1)th stage cascaded signal.

A second end of the first switch connects with an input end of the first inverter and a second end of the second switch. A first end of the second switch connects with an output end of the second inverter.

An input end of the second inverter connects with a second end of the third switch and a second end of the fourth switch.

An output end of the first inverter and a first end of the third switch connect with an output end of the scan-level-signal-output module.

In the scan-driving circuit of the present disclosure, the present-stage cascaded-signal-output module comprises a NAND gate controller.

A first input end of the NAND gate controller is connected with the output end of the scan-level-signal-output module, a second input end of the NAND gate controller inputs the present-stage clock signal, and an output end of the NAND gate controller is connected with an output end of the present-stage cascaded-signal-output module.

In the scan-driving circuit of the present disclosure, the present-stage scanning-signal-output module comprises a third inverter, a fourth inverter and a fifth inverter connected in series.

An input end of the third inverter is connected with the output end of the present-stage cascaded-signal-output module, and an output end of the fifth inverter is connected with the output end of the present-stage scanning-signal-output module.

In the scan-driving circuit of the present disclosure, the scan-driving circuit further comprises a reset module, which comprises a fifth switch. A control end of the fifth switch receiving a reset signal, a first end of the fifth switch receives a constant-low voltage signal, and a second end of the fifth switch is connected with the output end of the scan-level-signal-output module. The fifth switch is a P-type thin film transistor. The first end, the second end and the control end of the fifth switch are respectively a source electrode, a drain electrode, and a gate electrode.

In the scan-driving circuit of the present disclosure, each of the scan-driving units is for driving a scanning line.

According to the objectives of the present disclosure, the present disclosure further provides liquid crystal display, which comprises a scan-driving circuit, which comprises a plurality of scan-driving units connected in a cascade mode, a (N)th scan-driving unit of the scan-driving units comprises:

A scan-level-signal-output module is used for inputting a forward/reverse scanning control signal, a (N−1)th stage cascaded signal, and a (N+1)th stage cascaded signal, a scanning level signal is generated based on the forward/reverse scanning control signal, the (N−1)th stage cascaded signal, and the (N+1)th stage cascaded signal, and performs a latching operation on the scanning level signal, wherein the forward/reverse scanning control signal is used for controlling the scanning drive unit being on a forward-driving mode or a reverse-driving mode.

A present-stage cascaded-signal-output module is connected with the scan-level-signal-output module for inputting a present-stage clock signal and generating a present-stage cascaded signal based on the present-stage clock signal and the scanning level signal.

A present-stage scanning-signal-output module is connected with the present-stage cascaded-signal-output module, for outputting a present-stage scanning signal based on the present-stage cascaded signal.

In the scan-driving circuit of the present disclosure, the scan-level-signal-output module comprises a first switch, a second switch, a third switch, a fourth switch, a first inverter and a second inverter. The first switch and the fourth switch are N-type thin film transistors, the second switch and the third switch are P-type thin film transistors.

A first end of the first switch and a first end of the fourth switch both receive the forward/reverse scanning control signal. A control end of the first switch and a control end of the second switch receive the (N−1)th stage cascaded signal. A control end of the third switch and a control end of the fourth switch receive the (N+1)th stage cascaded signal.

A second end of the first switch connects with an input end of the first inverter and a second end of the second switch. A first end of the second switch connects with an output end of the second inverter.

An input end of the second inverter connects with a second end of the third switch and a second end of the fourth switch.

An output end of the first inverter and a first end of the third switch connect with an output end of the scan-level-signal-output module.

In the scan-driving circuit of the present disclosure, the scan-level-signal-output module comprises a first switch, a second switch, a third switch, a fourth switch, a first inverter and a second inverter. The first switch and the fourth switch are P-type thin film transistors. The second switch and the third switch are N-type thin film transistors.

A first end of the first switch and a first end of the fourth switch both receive the forward/reverse scanning control signal. A control end of the first switch and a control end of the second switch receive the (N+1)th stage cascaded signal. A control end of the third switch and a control end of the fourth switch receive the (N−1)th stage cascaded signal.

A second end of the first switch connects with an input end of the first inverter and a second end of the second switch. A first end of the second switch connects with an output end of the second inverter.

An input end of the second inverter connects with a second end of the third switch and a second end of the fourth switch.

An output end of the first inverter and a first end of the third switch connect with an output end of the scan-level-signal-output module.

In the scan-driving circuit of the present disclosure, the scan-driving circuit further comprises a reset module, which comprises a fifth switch. A control end of the fifth switch receiving a reset signal, a first end of the fifth switch receives a constant-low voltage signal, and a second end of the fifth switch is connected with the output end of the scan-level-signal-output module. The fifth switch is a P-type thin film transistor. The first end, the second end and the control end of the fifth switch are respectively a source electrode, a drain electrode, and a gate electrode.

With the above technical proposal, the benefits of the present disclosure are: an (N)th scan-driving unit of the scan-driving circuit according to the present disclosure comprises a scan-level-signal-output module, a present-stage cascaded-signal-output module, and a present-stage scanning-signal-output module. The scan-level-signal-output module is used for inputting a forward/reverse scanning control signal, a (N−1)th stage cascaded signal, and a (N+1)th stage cascaded signal, a scanning level signal is generated based on the forward/reverse scanning control signal, the (N−1)th stage cascaded signal, and the (N+1)th stage cascaded signal, and performs a latching operation on the scanning level signal, wherein the forward/reverse scanning control signal is used for controlling the scanning drive unit being on a forward-driving mode or a reverse-driving mode, which can not only greatly reduce the number of thin film transistors in the scan-driving circuit, but also the thin film transistors are driven with almost no clock signal, to greatly reduce the loading on the clock signal line, to reduce the power consumption of the scan-driving circuit, further reducing the panel frame width.

In order to make the foregoing of the present disclosure more clear, the preferred embodiments are given hereinafter and are to be described in detail with reference to the accompanying drawings:

BRIEF DESCRIPTION OF THE DRAWINGS

The technical proposals of the present disclosure and other advantageous effects will be apparent from the following detailed description of specific embodiments of the present disclosure taken in conjunction with the accompanying drawings.

DETAILED DESCRIPTION OF THE PREFERRED EMBODIMENTS

The technical means and the effects thereof will be described in further detail with reference to the preferred embodiments of the present disclosure and their accompanying drawings. Obviously, the described embodiments are merely part of the present disclosure, and not all embodiments. All other embodiments obtained by those of ordinary skill in the art without making inventive work are within the scope of the present disclosure, based on embodiments in the present invention.

The scan-driving circuit of the embodiment of the present disclosure includes a plurality of scan-driving units connected in a cascade mode; each of the scan-driving units is for driving a scanning line.

Figure 1:
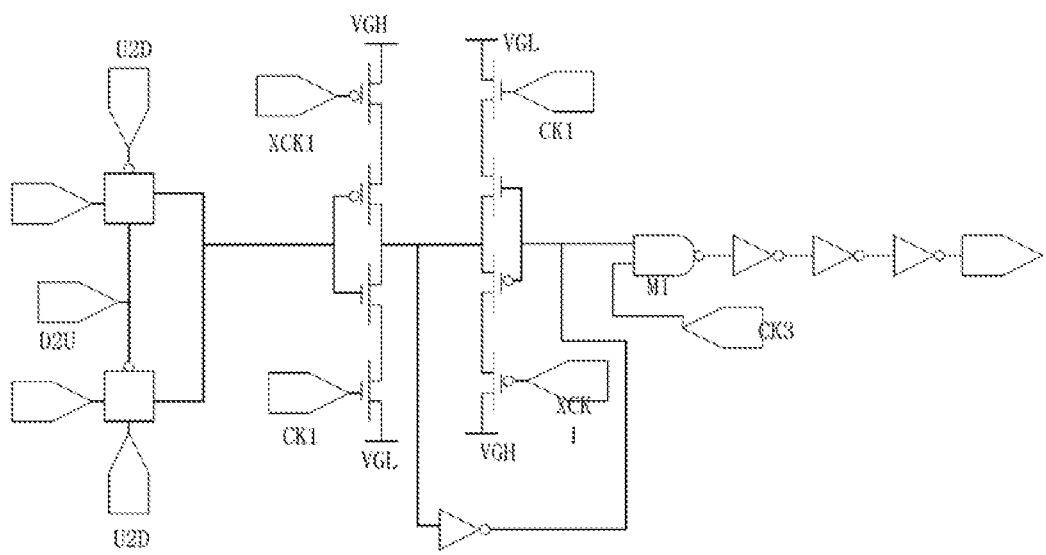
FIG. 1 is a schematic illustrative drawing of a conventional scan-driving circuit.
Figure 2:
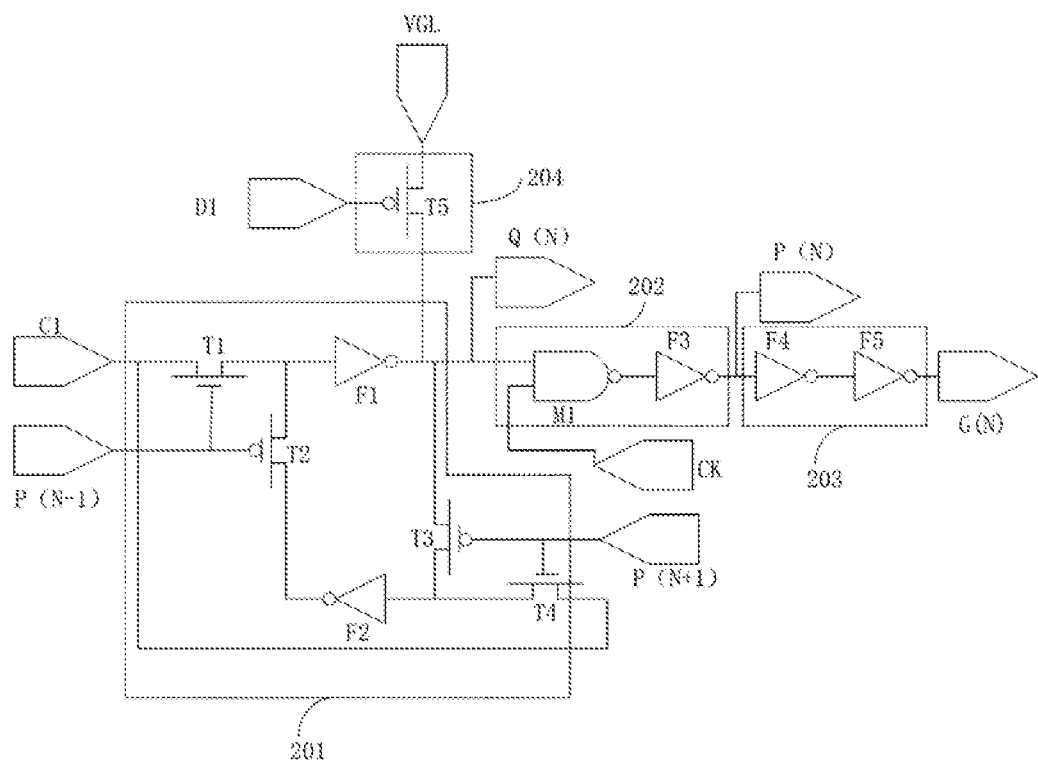
FIG. 2 is a schematic illustrative drawing of a first preferred embodiment of a scan-driving circuit according to the present disclosure.

Referring to FIG. 2, FIG. 2 is a schematic illustrative drawing of a first preferred embodiment of a scan-driving circuit according to the present disclosure. As shown in FIG. 2, an (N)th scan-driving unit of the scan-driving units includes: a scan-level-signal-output module 201, a present-stage cascaded-signal-output module 202, and a present-stage scanning-signal-output module 203. The scan-level-signal-output module 201 is used for inputting a forward/reverse scanning control signal C1, a (N−1)th stage cascaded signal P(N−1), and a (N+1)th stage cascaded signal P(N+1), a scanning level signal Q(N) is generated based on the forward/reverse scanning control signal C1, the (N−1)th stage cascaded signal P(N−1), and the (N+1)th stage cascaded signal P(N+1), and performs a latching operation on the scanning level signal Q(N), wherein the forward/reverse scanning control signal C1 is used for controlling the scanning drive unit being on a forward-driving mode or a reverse-driving mode. The present-stage cascaded-signal-output module 202 is connected with the scan-level-signal-output module 201 for inputting a present-stage clock signal CK and generating a present-stage cascaded signal P(N) based on the present-stage clock signal CK and the scanning level signal Q(N). The present-stage scanning-signal-output module 203 is connected with the present-stage cascaded-signal-output module 202 for outputting a present-stage scanning signal G(N) based on the present-stage cascaded signal P(N).

The scan-level-signal-output module 201 includes a first switch T1, a second switch T2, a third switch T3, a fourth switch T4, a first inverter F1 and a second inverter F2. A first end of the first switch T1 and a first end of the fourth switch T4 both receive the forward/reverse scanning control signal C1. A control and of the first switch T1 and a control end of the second switch T2 receive the (N−1)th stage cascaded signal P(N−1). A control end of the third switch T3 and a control end of the fourth switch T4 receive the (N+1)th stage cascaded signal P(N+1). A second end of the first switch T1 connects with an input end of the first inverter F1 and a second end of the second switch T2. A first end of the second switch 2 connects with an output end of the second inverter F2. An input end of the second inverter F2 connects with a second end of the third switch T3 and a second end of the fourth switch T4. An output end of the first inverter F1 and a first end of the third switch T3 connect with an output end of the scan-level-signal-output module 201.

In the preferred embodiment, the first switch T1 and the fourth switch T4 are N-type thin film transistors, the second switch T2 and the third switch T3 are P-type thin film transistors. The first ends, the second ends and the control ends of the first switch T1, the second switch T2, the third switch T3, and the fourth switch T4 are respectively source electrodes, drain electrodes, and gate electrodes.

In the preferred embodiment, the present-stage cascaded-signal-output module 202 includes a NAND gate controller M1 and a third inverter F3. A first input end of the NAND gate controller M1 is connected with the output end of the scan-level-signal-output module 201, a second input end of the NAND gate controller M1 inputs the present-stage clock signal CK, and an output end of the NAND gate controller M1 is connected with an input end of the third inverter F3. An output end of the third inverter F3 is connected with an output end of the present-stage cascaded-signal-output module 202.

In the preferred embodiment, the present-stage scanning-signal-output module 203 includes a fourth inverter F4 and a fifth inverter F5 connected in series. An input end of the fourth inverter F4 is connected with the output end of the present-stage cascaded-signal-output module 202, and an output end of the fifth inverter F5 is connected with the output end of the present-stage scanning-signal-output module 203.

The scan-driving circuit further includes a reset module 204, which includes a fifth switch T5. A control end of the fifth switch T5 receiving a reset signal D1, a first end of the fifth switch T5 receives a constant-low voltage signal VGL, and a second end of the fifth switch T5 is connected with the output end of the scan-level-signal-output module 201. The fifth switch T5 is a P-type thin film transistor. The first end, the second end and the control end of the fifth switch T5 are respectively a source electrode, a drain electrode, and a gate electrode.

Figure 3:
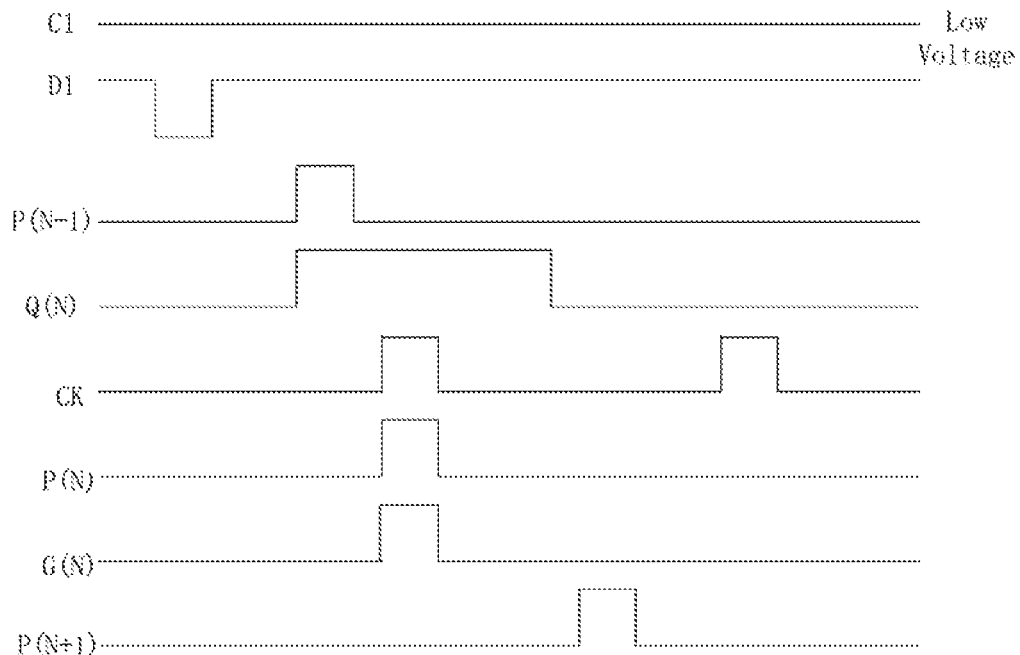
FIG. 3 is a forward-driving working time diagram of a first preferred embodiment of a scan-driving circuit according to the present disclosure.

Referring to FIG. 3, FIG. 3 is a forward-driving working time diagram of a first preferred embodiment of a scan-driving circuit according to the present disclosure. As shown in FIGS. 2 and 3, when the forward/reverse scanning control signal C1 is at a low voltage, the circuit is on forward-driving mode, in other words, the scan-driving units of the scan-driving circuit is driven orderly from the first stage to the last stage.

During the operation of the circuit, the circuit is reset by the reset module 204. Specifically, when the reset signal D1 is at a low voltage, the fifth switch T5 is turned on, and the constant-low voltage signal VGL outputs a low voltage to the output end of the scan-level-signal-output module 201 through the fifth switch T5, so that the scanning level signal Q(N) is at a low voltage, and since the third switch T3 and the second switch T2 are turned on and the scanning level signal Q(N) is sequentially passing through the third switch T3, the second inverter F2, the second switch T2, and the first inverter F1, to latch the scanning level signal Q(N) at a low voltage.

When the (N−1)th stage cascaded signal P(N−1) is at a high voltage, the first switch T1 is turned on, and the forward/reverse scanning control signal C1 passes through the first switch T1 and the first inverter F1 to charge the scanning level signal Q(N) to a high voltage. Then, the (N−1)th stage cascaded signal P(N−1) is at a low voltage. And since the (N+1)th stage cascaded signal P(N+1) is at a low voltage, so that the third switch T3 and the second switch T2 are turned on, and the scanning level signal Q(N) orderly passes through the third switch T3, the second inverter F2, the second switch T2 and the first inverter F1, to make the scanning level signal Q(N) be at a high voltage.

When the present-stage clock signal CK is at a high voltage, the scanning level signal Q(N) and the present-stage clock signal CK make the present-stage cascaded signal P(N) be at a high voltage by passing through the NAND gate controller M and the third inverter F3; furthermore, the scanning level signal Q(N) and the present-stage clock signal CK make the present-stage scanning signal G(N) be at a high voltage by passing through the fourth inverter F4 and the fifth inverter F5.

Figure 4:
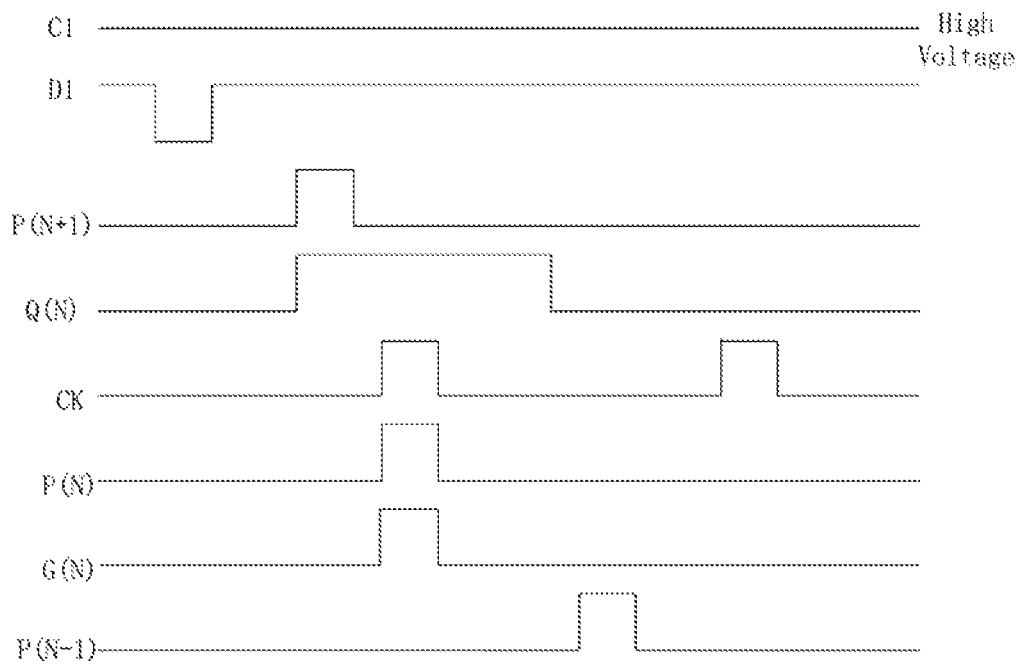
FIG. 4 is a reverse-driving working time diagram of a first preferred embodiment of a scan-driving circuit according to the present disclosure.

FIG. 4 is a reverse-driving working time diagram of a first preferred embodiment of a scan-driving circuit according to the present disclosure. As shown in FIGS. 2 and 3, when the forward/reverse scanning control signal C1 is at a high voltage, the circuit is on reverse-driving mode, in other words, the scan-driving units of the scan-driving circuit is driven orderly from the last stage to the first stage.

During the operation of the circuit, the circuit is reset by the reset module 204. Specifically, when the reset signal D1 is at a low voltage, the fifth switch T5 is turned on, and the constant-low voltage signal VGL outputs a low voltage to the output end of the scan-level-signal-output module 201 through the fifth switch T5, so that the scanning level signal Q(N) is at a low voltage, and since the third switch T3 and the second switch T2 are turned on and the scanning level signal Q(N) is sequentially passing through the third switch T3, the second inverter F2, the second switch T2, and the first inverter F1, to latch the scanning level signal Q(N) at a low voltage.

When the (N+1)th stage cascaded signal P(N+1) is at a high voltage, the fourth switch T4 is turned on, the (N−1)th stage cascaded signal P(N−1) is at a low voltage, the second switch T2 is turned on, and the forward/reverse scanning control signal C1 passes through the fourth switch T4, the second inverter F2, the second switch T2 and the first inverter F1 to charge the scanning level signal Q(N) to a high voltage. Then, the (N+1)th stage cascaded signal P(N+1) is at a low voltage. And since the (N−1)th stage cascaded signal P(N−1) is at a low voltage, so that the third switch T3 and the second switch T2 are turned on, and the scanning level signal Q(N) orderly passes through the third switch T3, the second inverter F2, the second switch T2 and the first inverter F1, to latch the scanning level signal Q(N) at a high/low voltage.

When the present-stage clock signal CK is at a high voltage, the scanning level signal Q(N) and the present-stage clock signal CK make the present-stage cascaded signal P(N) be at a high voltage by passing through the NAND gate controller M1 and the third inverter F3; furthermore, the scanning level signal Q(N) and the present-stage clock signal CK make the present-stage scanning signal G(N) be at a high voltage by passing through the fourth inverter F4 and the fifth inverter F5.

The scan-driving circuit of the present disclosure can not only greatly reduce the number of thin film transistors in the scan-driving circuit, but also the thin film transistors are driven with almost no clock signal, to greatly reduce the loading on the clock signal line, to reduce the power consumption of the scan-driving circuit, further reducing the panel frame width.

Figure 5:
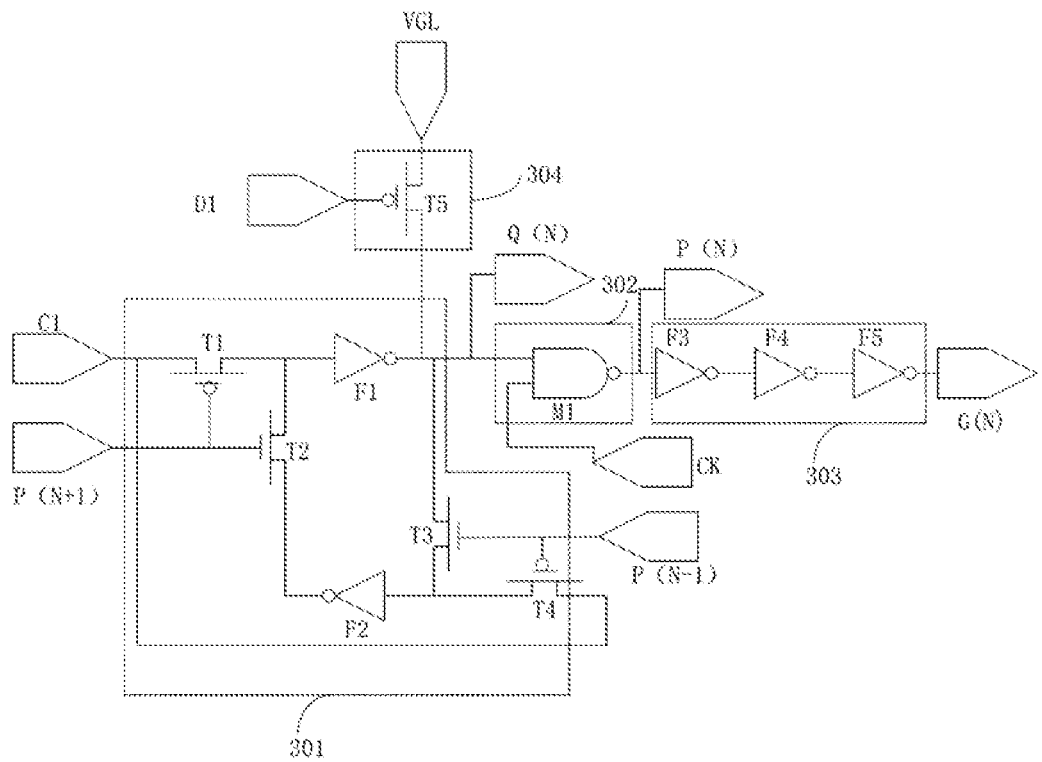
FIG. 5 is a schematic illustrative drawing of a second preferred embodiment of a scan-driving circuit according to the present disclosure.

FIG. 5 is a schematic illustrative drawing of a second preferred embodiment of a scan-driving circuit according to the present disclosure. As shown in FIG. 5, an (N)th scan-driving unit of the scan-driving units includes: a scan-level-signal-output module 301, a present-stage cascaded-signal-output module 302, and a present-stage scanning-signal-output module 303. The scan-level-signal-output module 301 is used for inputting a forward/reverse scanning control signal C1, a (N−1)th stage cascaded signal P(N−1), and a (N+1)th stage cascaded signal P(N+1), a scanning level signal Q(N) is generated based on the forward/reverse scanning control signal C1, the (N−1)th stage cascaded signal P(N−1), and the (N+1)th stage cascaded signal P(N+1), and performs a latching operation on the scanning level signal Q(N), wherein the forward/reverse scanning control signal C1 is used for controlling the scanning drive unit being on a forward-driving mode or a reverse-driving mode. The present-stage cascaded-signal-output module 302 is connected with the scan-level-signal-output module 301 for inputting a present-stage clock signal CK and generating a present-stage cascaded signal P(N) based on the present-stage clock signal CK and the scanning level signal Q(N). The present-stage scanning-signal-output module 303 is connected with the present-stage cascaded-signal-output module 302 for outputting a present-stage scanning signal G(N) based on the present-stage cascaded signal P(N).

The scan-level-signal-output module 301 includes a first switch T1, a second switch T2, a third switch T3, a fourth switch T4, a first inverter F1 and a second inverter F2. A first end of the first switch T1 and a first end of the fourth switch T4 both receive the forward/reverse scanning control signal C1. A control end of the first switch T1 and a control end of the second switch T2 receive the (N+1)th stage cascaded signal P(N+1). A control end of the third switch T3 and a control end of the fourth switch T4 receive the (N−1)th stage cascaded signal P(N−1). A second end of the first switch T1 connects with an input end of the first inverter F1 and a second end of the second switch T2. A first end of the second switch T2 connects with an output end of the second inverter F2. An input end of the second inverter F2 connects with a second end of the third switch T3 and a second end of the fourth switch T4. An output end of the first inverter F1 and a first end of the third switch T3 connect with an output end of the scan-level-signal-output module 301.

In the preferred embodiment, the first switch T1 and the fourth switch T4 are P-type thin film transistors, the second switch T2 and the third switch T3 are N-type thin film transistors. The first ends, the second ends and the control ends of the first switch T1, the second switch T2, the third switch T3, and the fourth switch T4 are respectively source electrodes, drain electrodes, and gate electrodes.

In the preferred embodiment, the present-stage cascaded-signal-output module 302 includes a NAND gate controller M1. A first input end of the NAND gate controller M1 is connected with the output end of the scan-level-signal-output module 301, a second input end of the NAND gate controller M1 inputs the present-stage clock signal CK, and an output end of the NAND gate controller M1 is connected with an output end of the present-stage cascaded-signal-output module 302.

In the preferred embodiment, the present-stage scanning-signal-output module 303 includes a third inverter F3, a fourth inverter F4 and a fifth inverter F5 connected in series. An input end of the third inverter F3 is connected with the output end of the present-stage cascaded-signal-output module 302, and an output end of the fifth inverter F5 is connected with the output end of the present-stage scanning-signal-output module 303.

The scan-driving circuit further includes a reset module 304, which includes a fifth switch T5. A control end of the fifth switch T5 receiving a reset signal D1, a first end of the fifth switch T5 receives a constant-low voltage signal VGL, and a second end of the fifth switch T5 is connected with the output end of the scan-level-signal-output module 301. The fifth switch is a P-type thin film transistor. The first end, the second end and the control end of the fifth switch are respectively a source electrode, a drain electrode, and a gate electrode.

A first input end of the NAND gate controller M1 is connected with the output end of the scan-level-signal-output module 201, a second input end of the NAND gate controller M1 inputs the present-stage clock signal CK, and an output end of the NAND gate controller M1 is connected with an input end of the third inverter F3. An output end of the third inverter F3 is connected with an output end of the present-stage cascaded-signal-output module 202.

In the preferred embodiment, the present-stage scanning-signal-output module 203 includes a fourth inverter F4 and a fifth inverter F5 connected in series. An input end of the fourth inverter F4 is connected with the output end of the present-stage cascaded-signal-output module 202, and an output end of the fifth inverter F5 is connected with the output end of the present-stage scanning-signal-output module 203.

The scan-driving circuit further includes a reset module 204, which includes a fifth switch T5. A control end of the fifth switch T5 receiving a reset signal D1, a first end of the fifth switch T5 receives a constant-low voltage signal VGL, and a second end of the fifth switch T5 is connected with the output end of the scan-level-signal-output module 201. The fifth switch T5 is a P-type thin film transistor. The first end, the second end and the control end of the fifth switch T5 are respectively a source electrode, a drain electrode, and a gate electrode.

Figure 6:
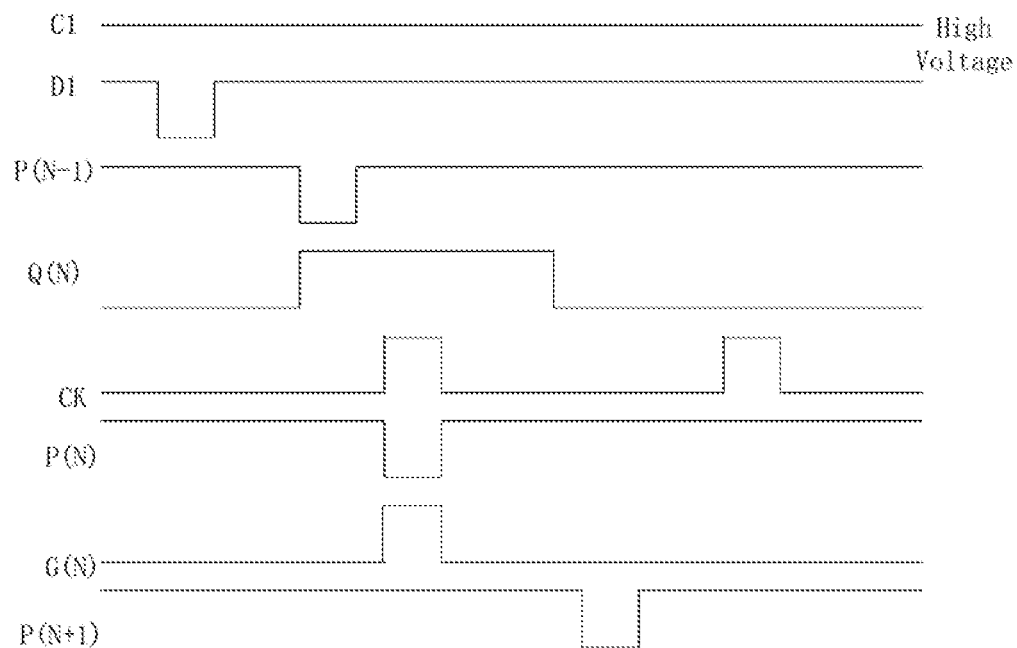
FIG. 6 is a forward-driving working time diagram of a second preferred embodiment of a scan-driving circuit according to the present disclosure.

FIG. 6 is a forward-driving working time diagram of a second preferred embodiment of a scan-driving circuit according to the present disclosure. As shown in FIGS. 5 and 6, when the forward/reverse scanning control signal C1 is at a high voltage, the circuit is on forward-driving mode, in other words, the scan-driving units of the scan-driving circuit is driven orderly from the first stage to the last stage.

During the operation of the circuit, the circuit is reset by the reset module 304. Specifically, when the reset signal D1 is at a low voltage, the fifth switch T5 is turned on, and the constant-low voltage signal VGL outputs a low voltage to the output end of the scan-level-signal-output module 301 through the fifth switch T5, so that the scanning level signal Q(N) is at a low voltage, and since the third switch T3 and the second switch T2 are turned on and the scanning level signal Q(N) is sequentially passing through the third switch T3, the second inverter F2, the second switch T2, and the first inverter F1, to latch the scanning level signal Q(N) at a low voltage.

When the (N−1)th stage cascaded signal P(N−1) is at a low voltage, the fourth switch T4 is turned on, the (N+1)th stage cascaded signal P(N+1) is at a high voltage, the second switch T2 is turned on, and the forward/reverse scanning control signal C1 passes through the fourth switch T4, the second inverter F2, the second switch T2, and the first inverter F1 to charge the scanning level signal Q(N) to a high voltage. Then, the (N−1)th stage cascaded signal P(N−1) is at a high voltage. And since the (N+1)th stage cascaded signal P(N+1) is at a high voltage, so that the third switch T3 and the second switch T2 are turned on, and the scanning level signal Q(N) orderly passes through the third switch T3, the second inverter F2, the second switch T2 and the first inverter F1, to latch the scanning level signal Q(N) at a high voltage.

When the present-stage clock signal CK is at a high voltage, the scanning level signal Q(N) and the present-stage clock signal CK make the present-stage cascaded signal P(N) be at a low voltage by passing through the NAND gate controller M1; furthermore, the scanning level signal Q(N) and the present-stage clock signal CK make the present-stage scanning signal G(N) be at a high voltage by passing through the third inverter F3, the fourth inverter F4 and the fifth inverter F5

Figure 7:
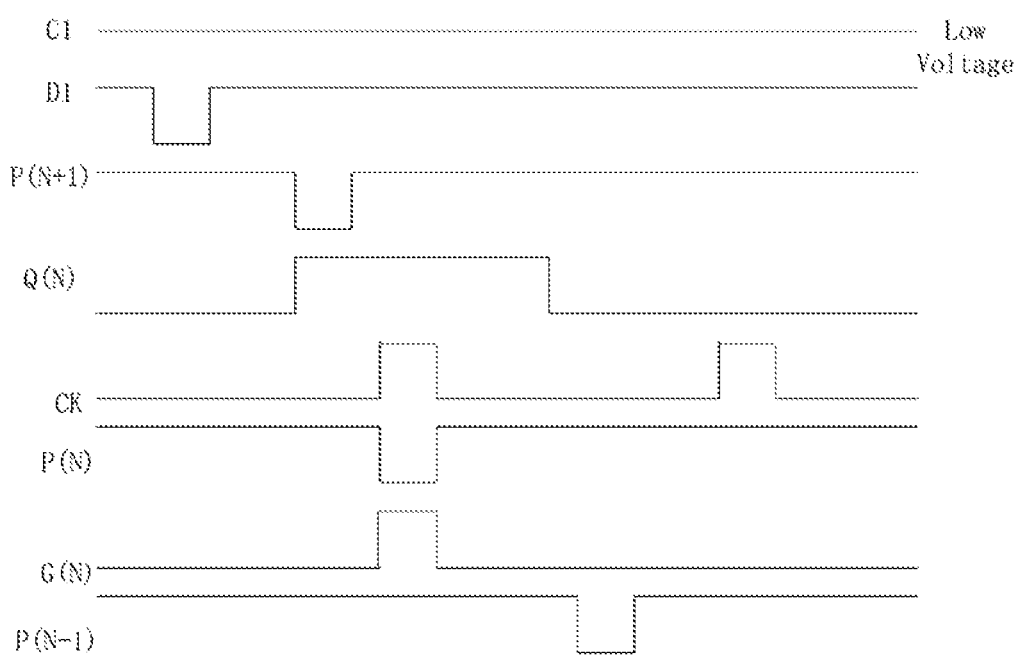
FIG. 7 is a reverse-driving working time diagram of a second preferred embodiment of a scan-driving circuit according to the present disclosure.

FIG. 7 is a reverse-driving working time diagram of a second preferred embodiment of a scan-driving circuit according to the present disclosure. As shown in FIGS. 5 and 7, when the forward/reverse scanning control signal C1 is at a low voltage, the circuit is on reverse-driving mode, in other words, the scan-driving units of the scan-driving circuit is driven orderly from the last stage to the first stage.

During the operation of the circuit, the circuit is reset by the reset module 304. Specifically, when the reset signal D1 is at a low voltage, the fifth switch T5 is turned on, and the constant-low voltage signal VGL outputs a low voltage to the output end of the scan-level-signal-output module 301 through the fifth switch T5, so that the scanning level signal Q(N) is at a low voltage, and since the third switch T3 and the second switch T2 are turned on and the scanning level signal Q(N) is sequentially passing through the third switch T3, the second inverter F2, the second switch T2, and the first inverter F1, to latch the scanning level signal Q(N) at a low voltage.

When the (N+1)th stage cascaded signal P(N+1) is at a low voltage, the first switch T1 is turned on, and the forward/reverse scanning control signal C1 passes through the first switch T1 and the first inverter F1 to charge the scanning level signal Q(N) to a high voltage. Then, the (N−1)th stage cascaded signal P(N−1) is at a low voltage. And since the (N+1)th stage cascaded signal P(N+1) is at a low voltage, so that the third switch T3 and the second switch T2 are turned on, and the scanning level signal Q(N) orderly passes through the third switch T3, the second inverter F2, the second switch T2 and the first inverter F1, to make the scanning level signal Q(N) be at a high voltage.

When the present-stage clock signal CK is at a high voltage, the scanning level signal Q(N) and the present-stage clock signal CK make the present-stage cascaded signal P(N) be at a low voltage by passing through the NAND gate controller M1; furthermore, the scanning level signal Q(N) and the present-stage clock signal CK make the present-stage scanning signal G(N) be at a high voltage by passing through the third inverter F3, the fourth inverter F4 and the fifth inverter F5.

The scan-driving circuit of the present disclosure can not only greatly reduce the number of thin film transistors in the scan-driving circuit, but also the thin film transistors are driven with almost no clock signal, to greatly reduce the loading on the clock signal line, to reduce the power consumption of the scan-driving circuit, further reducing the panel frame width.

The scan-driving circuit of the present disclosure can not only greatly reduce the number of thin film transistors in the scan-driving circuit, but also the thin film transistors are driven with almost no clock signal, to greatly reduce the loading on the clock signal line, to reduce the power consumption of the scan-driving circuit, further reducing the panel frame width.

The present disclosure also provides a liquid crystal display including the above-described scan-driving circuit, and specific reference can be referred to the above description about the scan-driving circuit, and no more description is addressed herein.

The scan-driving circuit and the liquid crystal display of the present disclosure can not only greatly reduce the number of thin film transistors in the scan-driving circuit, but also the thin film transistors are driven with almost no clock signal, to greatly reduce the loading on the clock signal line, to reduce the power consumption of the scan-driving circuit, further reducing the panel frame width.

Although the present disclosure has been disclosed as preferred embodiments, the foregoing preferred embodiments are not intended to limit the present disclosure. Those of ordinary skill in the art, without departing from the spirit and scope of the present disclosure, can make various kinds of modifications and variations to the present disclosure. Therefore, the scope of the claims of the present disclosure must be defined.

What is claimed is:

1. A scan-driving circuit, wherein the scan-driving circuit comprises a plurality of scan-driving units connected in a cascade mode, a (N)th scan-driving unit of the scan-driving units comprising:
    a scan-level-signal-output module, for inputting a forward/reverse scanning control signal, a (N−1)th stage cascaded signal, and a (N+1)th stage cascaded signal, a scanning level signal being generated based on the forward/reverse scanning control signal, the (N−1)th stage cascaded signal, and the (N+1)th stage cascaded signal, and a latching operation being performed on the scanning level signal, wherein the forward/reverse scanning control signal being for controlling the scanning drive unit being on a forward-driving mode or a reverse-driving mode;
    a present-stage cascaded-signal-output module connecting with the scan-level-signal-output module for inputting a present-stage clock signal and generating a present-stage cascaded signal based on the present-stage clock signal and the scanning level signal; and
    a present-stage scanning-signal-output module connecting with the present-stage cascaded-signal-output module, for outputting a present-stage scanning signal based on the present-stage cascaded signal;
    the scan-level-signal-output module comprising a first switch, a second switch, a third switch, a fourth switch, a first inverter and a second inverter; wherein the first switch and the fourth switch are N-type thin film transistors, the second switch and the third switch are P-type thin film transistors;
    a first end of the first switch and a first end of the fourth switch both receiving the forward/reverse scanning control signal; a control end of the first switch and a control end of the second switch receiving the (N−1)th stage cascaded signal; a control end of the third switch and a control end of the fourth switch receiving the (N+1)th stage cascaded signal;
    a second end of the first switch connecting with an input end of the first inverter and a second end of the second switch; a first end of the second switch connecting with an output end of the second inverter;
    an input end of the second inverter connecting with a second end of the third switch and a second end of the fourth switch;
    an output end of the first inverter and a first end of the third switch connecting with an output end of the scan-level-signal-output module.

2. The scan-driving circuit according to claim 1, wherein the present-stage cascaded-signal-output module comprises a NAND gate controller and a third inverter;
    a first input end of the NAND gate controller is connected with the output end of the scan-level-signal-output module, a second input end of the NAND gate controller inputs the present-stage clock signal, an output end of the NAND gate controller is connected with an input end of the third inverter, and an output end of the third inverter is connected with an output end of the present-stage cascaded-signal-output module.

3. The scan-driving circuit according to claim 2, wherein the present-stage scanning-signal-output module comprises a fourth inverter and a fifth inverter connected in series;
    an input end of the fourth inverter is connected with the output end of the present-stage cascaded-signal-output module, and an output end of the fifth inverter is connected with the output end of the present-stage scanning-signal-output module.

4. The scan-driving circuit according to claim 1, wherein the present-stage cascaded-signal-output module comprises a NAND gate controller;
    a first input end of the NAND gate controller is connected with the output end of the scan-level-signal-output module, a second input end of the NAND gate controller inputs the present-stage clock signal, an output end of the NAND gate controller is connected with an output end of the present-stage cascaded-signal-output module.

5. The scan-driving circuit according to claim 4, wherein the present-stage scanning-signal-output module comprises a third inverter, a fourth inverter and a fifth inverter connected in series;
    an input end of the third inverter is connected with the output end of the present-stage cascaded-signal-output module, and an output end of the fifth inverter is connected with the output end of the present-stage scanning-signal-output module.

6. The scan-driving circuit according to claim 1, wherein the scan-driving circuit further comprises a reset module, which comprises a fifth switch, a control end of the fifth switch receiving a reset signal, a first end of the fifth switch receives a constant-low voltage signal, and a second end of the fifth switch is connected with the output end of the scan-level-signal-output module; wherein the fifth switch is a P-type thin film transistor, the first end, the second end and the control end of the fifth switch are respectively a source electrode, a drain electrode, and a gate electrode.

7. The scan-driving circuit according to claim 1, wherein each of the scan-driving units is for driving a scanning line.

8. A scan-driving circuit, wherein the scan-driving circuit comprises a plurality of scan-driving units connected in a cascade mode, a (N)th scan-driving unit of the scan-driving units comprising:

a scan-level-signal-output module for inputting a forward/reverse scanning control signal, a (N−1)th stage cascaded signal, and a (N+1)th stage cascaded signal, a scanning level signal being generated based on the forward/reverse scanning control signal, the (N−1)th stage cascaded signal, and the (N+1)th stage cascaded signal, and a latching operation being performed on the scanning level signal, wherein the forward/reverse scanning control signal being for controlling the scanning drive unit being on a forward-driving mode or a reverse-driving mode;

a present-stage cascaded-signal-output module connecting with the scan-level-signal-output module for inputting a present-stage clock signal and generating a present-stage cascaded signal based on the present-stage clock signal and the scanning level signal; and a present-stage scanning-signal-output module connecting with the present-stage cascaded-signal-output module, for outputting a present-stage scanning signal based on the present-stage cascaded signal.

9. The scan-driving circuit according to claim 8, wherein the scan-level-signal-output module comprising a first switch, a second switch, a third switch, a fourth switch, a first inverter and a second inverter; wherein the first switch and the fourth switch are N-type thin film transistors, the second switch and the third switch are P-type thin film transistors;

a first end of the first switch and a first end of the fourth switch both receiving the forward/reverse scanning control signal; a control end of the first switch and a control end of the second switch receiving the (N−1)th stage cascaded signal; a control end of the third switch and a control end of the fourth switch receiving the (N+1)th stage cascaded signal;

a second end of the first switch connecting with an input end of the first inverter and a second end of the second switch; a first end of the second switch connecting with an output end of the second inverter;

an input end of the second inverter connecting with a second end of the third switch and a second end of the fourth switch;

an output end of the first inverter and a first end of the third switch connecting with an output end of the scan-level-signal-output module.

10. The scan-driving circuit according to claim 9, wherein the present-stage cascaded-signal-output module comprises a NAND gate controller and a third inverter;

a first input end of the NAND gate controller is connected with the output end of the scan-level-signal-output module, a second input end of the NAND gate controller inputs the present-stage clock signal, an output end of the NAND gate controller is connected with an input end of the third inverter, and an output end of the third inverter is connected with an output end of the present-stage cascaded-signal-output module.

11. The scan-driving circuit according to claim 10, wherein the present-stage scanning-signal-output module comprises a fourth inverter and a fifth inverter connected in series;

an input end of the fourth inverter is connected with the output end of the present-stage cascaded-signal-output module, and an output end of the fifth inverter is connected with the output end of the present-stage scanning-signal-output module.

12. The scan-driving circuit according to claim 8, wherein the scan-level-signal-output module comprising a first switch, a second switch, a third switch, a fourth switch, a first inverter and a second inverter; wherein the first switch and the fourth switch are P-type thin film transistors, the second switch and the third switch are N-type thin film transistors;

a first end of the first switch and a first end of the fourth switch both receiving the forward/reverse scanning control signal; a control end of the first switch and a control end of the second switch receiving the (N+1)th stage cascaded signal; a control end of the third switch and a control end of the fourth switch receiving the (N−1)th stage cascaded signal;

a second end of the first switch connecting with an input end of the first inverter and a second end of the second switch; a first end of the second switch connecting with an output end of the second inverter;

an input end of the second inverter connecting with a second end of the third switch and a second end of the fourth switch;

an output end of the first inverter and a first end of the third switch connecting with an output end of the scan-level-signal-output module.

13. The scan-driving circuit according to claim 12, wherein the present-stage cascaded-signal-output module comprises a NAND gate controller;

a first input end of the NAND gate controller is connected with the output end of the scan-level-signal-output module, a second input end of the NAND gate controller inputs the present-stage clock signal, an output end of the NAND gate controller is connected with an output end of the present-stage cascaded-signal-output module.

14. The scan-driving circuit according to claim 13, wherein the present-stage scanning-signal-output module comprises a third inverter, a fourth inverter and a fifth inverter connected in series;

an input end of the third inverter is connected with the output end of the present-stage cascaded-signal-output module, and an output end of the fifth inverter is connected with the output end of the present-stage scanning-signal-output module.

15. The scan-driving circuit according to claim 8, wherein the scan-driving circuit further comprises a reset module, which comprises a fifth switch, a control end of the fifth switch receiving a reset signal, a first end of the fifth switch receives a constant-low voltage signal, and a second end of the fifth switch is connected with the output end of the scan-level-signal-output module; wherein the fifth switch is a P-type thin film transistor, the first end, the second end and the control end of the fifth switch are respectively a source electrode, a drain electrode, and a gate electrode.

16. The scan-driving circuit according to claim 8, wherein each of the scan-driving units is for driving a scanning line.

17. A liquid crystal display, which comprising a scan-driving circuit, wherein the scan-driving circuit comprises a plurality of scan-driving units connected in a cascade mode, a (N)th scan-driving unit of the scan-driving units comprising:

a scan-level-signal-output module for inputting a forward/reverse scanning control signal, a (N−1)th stage cascaded signal, and a (N+1)th stage cascaded signal, a scanning level signal being generated based on the forward/reverse scanning control signal, the (N−1)th stage cascaded signal, and the (N+1)th stage cascaded signal, and a latching operation being performed on the scanning level signal, wherein the forward/reverse scanning control signal being for controlling the scanning drive unit being on a forward-driving mode or a reverse-driving mode;

a present-stage cascaded-signal-output module connecting with the scan-level-signal-output module for inputting a present-stage clock signal and generating a present-stage cascaded signal based on the present-stage clock signal and the scanning level signal; and a present-stage scanning-signal-output module connecting with the present-stage cascaded-signal-output module, for outputting a present-stage scanning signal based on the present-stage cascaded signal.

18. The scan-driving circuit according to claim 17, wherein the scan-level-signal-output module comprising a first switch, a second switch, a third switch, a fourth switch, a first inverter and a second inverter; wherein the first switch and the fourth switch are N-type thin film transistors, the second switch and the third switch are P-type thin film transistors;

a first end of the first switch and a first end of the fourth switch both receiving the forward/reverse scanning control signal; a control end of the first switch and a control end of the second switch receiving the (N−1)th stage cascaded signal; a control end of the third switch and a control end of the fourth switch receiving the (N+1)th stage cascaded signal;

a second end of the first switch connecting with an input end of the first inverter and a second end of the second switch; a first end of the second switch connecting with an output end of the second inverter;

an input end of the second inverter connecting with a second end of the third switch and a second end of the fourth switch;

an output end of the first inverter and a first end of the third switch connecting with an output end of the scan-level-signal-output module.

19. The scan-driving circuit according to claim 17, wherein the scan-level-signal-output module comprising a first switch, a second switch, a third switch, a fourth switch, a first inverter and a second inverter; wherein the first switch and the fourth switch are P-type thin film transistors, the second switch and the third switch are N-type thin film transistors:

a first end of the first switch and a first end of the fourth switch both receiving the forward/reverse scanning control signal; a control end of the first switch and a control end of the second switch receiving the (N+1)th stage cascaded signal; a control end of the third switch and a control end of the fourth switch receiving the (N−1)th stage cascaded signal;

a second end of the first switch connecting with an input end of the first inverter and a second end of the second switch; a first end of the second switch connecting with an output end of the second inverter;

an input end of the second inverter connecting with a second end of the third switch and a second end of the fourth switch;

an output end of the first inverter and a first end of the third switch connecting with an output end of the scan-level-signal-output module.

20. The scan-driving circuit according to claim 17, wherein the scan-driving circuit further comprises a reset module, which comprises a fifth switch, a control end of the fifth switch receiving a reset signal, a first end of the fifth switch receives a constant-low voltage signal, and a second end of the fifth switch is connected with the output end of the scan-level-signal-output module; wherein the fifth switch is a P-type thin film transistor, the first end, the second end and the control end of the fifth switch are respectively a source electrode, a drain electrode, and a gate electrode.

* * * * *